United States Patent
Makke et al.

(10) Patent No.: US 10,730,352 B2
(45) Date of Patent: Aug. 4, 2020

(54) SYSTEM AND METHOD FOR TIRE WEAR PROGNOSTICS

(71) Applicant: FORD GLOBAL TECHNOLOGIES, LLC, Dearborn, MI (US)

(72) Inventors: Omar Makke, Lyon Township, MI (US); Oleg Yurievitch Gusikhin, Commerce Township, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 15/902,717

(22) Filed: Feb. 22, 2018

(65) Prior Publication Data
US 2019/0255891 A1 Aug. 22, 2019

(51) Int. Cl.
*B60C 11/24* (2006.01)
*B60C 25/00* (2006.01)
*G07C 5/08* (2006.01)
*G01N 3/56* (2006.01)
*G01M 17/02* (2006.01)

(52) U.S. Cl.
CPC .......... *B60C 11/246* (2013.01); *B60C 25/007* (2013.01); *G01M 17/022* (2013.01); *G01N 3/56* (2013.01); *G07C 5/0816* (2013.01)

(58) Field of Classification Search
CPC .. B60C 11/246; B60C 25/007; G01M 17/022; G01N 3/56; G07C 5/0816
See application file for complete search history.

(56) References Cited

U.S. PATENT DOCUMENTS

| | | | |
|---|---|---|---|
| 6,212,947 B1 * | 4/2001 | Shimizu | G01M 17/02 73/146 |
| 7,119,896 B2 * | 10/2006 | Godeau | B60C 11/24 356/237.2 |
| 7,204,135 B2 * | 4/2007 | Robert | B60C 11/24 73/146 |
| 7,483,794 B2 * | 1/2009 | Bocquillon | B60C 11/24 701/36 |
| 7,557,694 B1 * | 7/2009 | Graham | B60C 11/24 340/438 |
| 7,762,129 B2 * | 7/2010 | Niklas | B60C 23/064 73/146.5 |
| 8,482,395 B2 | 7/2013 | Rysenga et al. | |
| 9,552,680 B2 | 1/2017 | Lavoie | |
| 2005/0273218 A1 * | 12/2005 | Breed | B60C 11/24 701/2 |
| 2012/0235807 A1 * | 9/2012 | Rysenga | B60C 23/0416 340/445 |
| 2017/0129498 A1 | 5/2017 | Singh et al. | |
| 2017/0190223 A1 | 7/2017 | Fish et al. | |

* cited by examiner

*Primary Examiner* — Francis C Gray
(74) *Attorney, Agent, or Firm* — Michael J. Spenner; Brooks Kushman P.C.

(57) ABSTRACT

A storage maintains coefficients that map histogram data elements to tire wear, the coefficients being trained based on a correlation of histogram data to measured tire wear. A processor is programmed to receive a wear data histogram from a vehicle, utilize the coefficients to translate the wear data histogram into a measure of physical tire wear; and send an alert message indicating the estimated tire wear.

20 Claims, 6 Drawing Sheets

SYSTEM AND METHOD FOR TIRE WEAR PROGNOSTICS

TECHNICAL FIELD

Aspects of the disclosure generally relate to systems and methods for performing prognostics related to tire wear.

BACKGROUND

Tread on tires becomes shallower as the tires are used. When this occurs, tire performance may change. For example, tires with shallower tread have improved dry pavement performance due to the increased contact area to the road, but worse wet pavement performance if the tires become unable to channel water out. A driver of a vehicle should monitor the wear of the tires on the vehicle, and replace the tires when the level of tread becomes too low.

SUMMARY

In one or more illustrative examples, a system includes a storage that maintains coefficients that map histogram data elements to tire wear, the coefficients being trained based on a correlation of histogram data to measured tire wear. The system also includes a processor programmed to receive a wear data histogram from a vehicle, utilize the coefficients to translate the wear data histogram into a measure of physical tire wear, and send an alert message indicating the estimated tire wear In one or more illustrative examples, a method includes utilizing coefficients that map histogram data elements to tire wear, the coefficients being trained based on a correlation of histogram data to measured tire wear, to translate a wear data histogram including a distribution of power indicative of wear to tires of the vehicle according to one or more variables into a measure of physical tire wear.

In one or more illustrative examples, a non-transitory computer-readable medium includes instructions that, when executed by a processor, cause the processor to utilize coefficients that map histogram data elements to tire wear, the coefficients being trained based on a correlation of histogram data to measured tire wear, to translate a wear data histogram including a distribution of power indicative of wear to tires of the vehicle according to one or more variables into a measure of physical tire wear

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Wear prediction on tires may be achieved using elaborate models and sensors. Such systems add cost to the vehicle. These costs include sensors to receive data and processors to analyze the data via the model. Streaming the sensor data to a cloud server reduces on-board processing requirements, but requires an unrealistically large amount of data to be transferred from the vehicle.

An improved system and method for providing tire wear prognostics is disclosed. The system and method utilizes a cloud system and physical tire wear data acquired from a vehicle to predict the tire wear for the vehicle. The physical tire wear data is compiled into a histogram to reduce the storage and data offload requirements on the vehicle. The histogram may record the tire wear data in terms of various factors such as velocity, steering angle, and/or temperature. The histogram is provided to the cloud system to perform machine learning on the data. The machine learning system may be trained based on experiments that correlate histogram data to measured tire wear. By using the machine learning process, the system identifies coefficients that translate the histogram data into a measure of the physical wear on the tire. Once trained, actual tire wear for vehicles may be predicted using histogram data received from the vehicles. By analyzing the tire wear data in this manner, the tire wear prognostics system analysis may converge actual tire wear for a vehicle after a few thousand miles of wear (which is a time period that is logical for verifying tire wear), while minimizing the amount of data required to perform the prediction.

Figure 1:
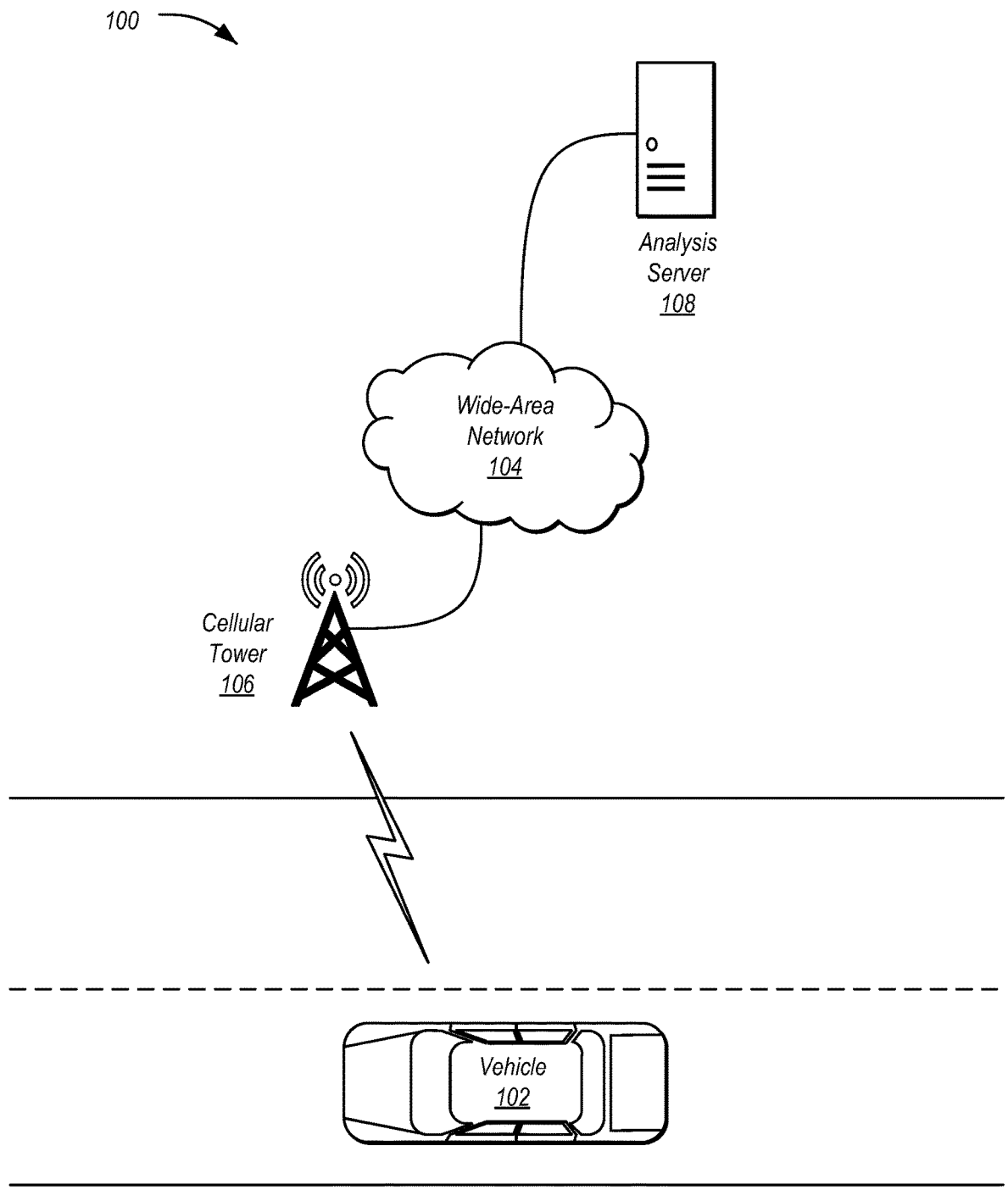
FIG. 1 illustrates an example system for analyzing wear data from a vehicle to perform tire wear prognostics.

FIG. 1 illustrates an example system 100 for analyzing wear data from a vehicle 102 to perform tire wear prognostics. As shown, the system 100 includes a vehicle 102 in communication with an analysis server 108 over a wide-area network 104. The vehicle 102 is configured to wirelessly communicate with cellular towers 106 connected to the wide-area network 104. The server 108 is also in communication with the wide-area network 104. While an example system 100 is shown in FIG. 1, the example components as illustrated are not intended to be limiting. Indeed, the system 100 may have more or fewer components, and additional or alternative components and/or implementations may be used. As an example, the system 100 may include more or fewer vehicles 102, cellular towers 106, and/or update servers 108.

The vehicles 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. Further aspects of the functionality of the vehicle 102 are discussed in detail with respect to FIG. 2.

The wide-area network 104 may include one or more interconnected communication networks such as the Internet, a cable television distribution network, a satellite link network, a local area network, a wide area network, and a telephone network, as some non-limiting examples. By accessing the wide-area network 104, the vehicle 102 may be able to send outgoing data from the vehicle 102 to network destinations on the wide-area network 104, and receive incoming data to the vehicle 102 from network destinations on the wide-area network 104.

The cellular towers 106 may include system hardware configured to allow cellular transceivers of the vehicles 102 to access the communications services of the wide-area network 104. In an example, the cellular towers 106 may be part of a Global System for Mobile communication (GSM) cellular service provider. In another example, the cellular towers 106 may be a part of a code division multiple access (CDMA) cellular service provider. The cellular towers 106 may support various different technologies and data speeds.

The analysis server 108 may include computing hardware configured to provide data services related to providing software updates 110 to the vehicles 102. Further aspects of the functionality of the analysis server 108 are discussed in detail with respect to FIG. 3.

Figure 2:
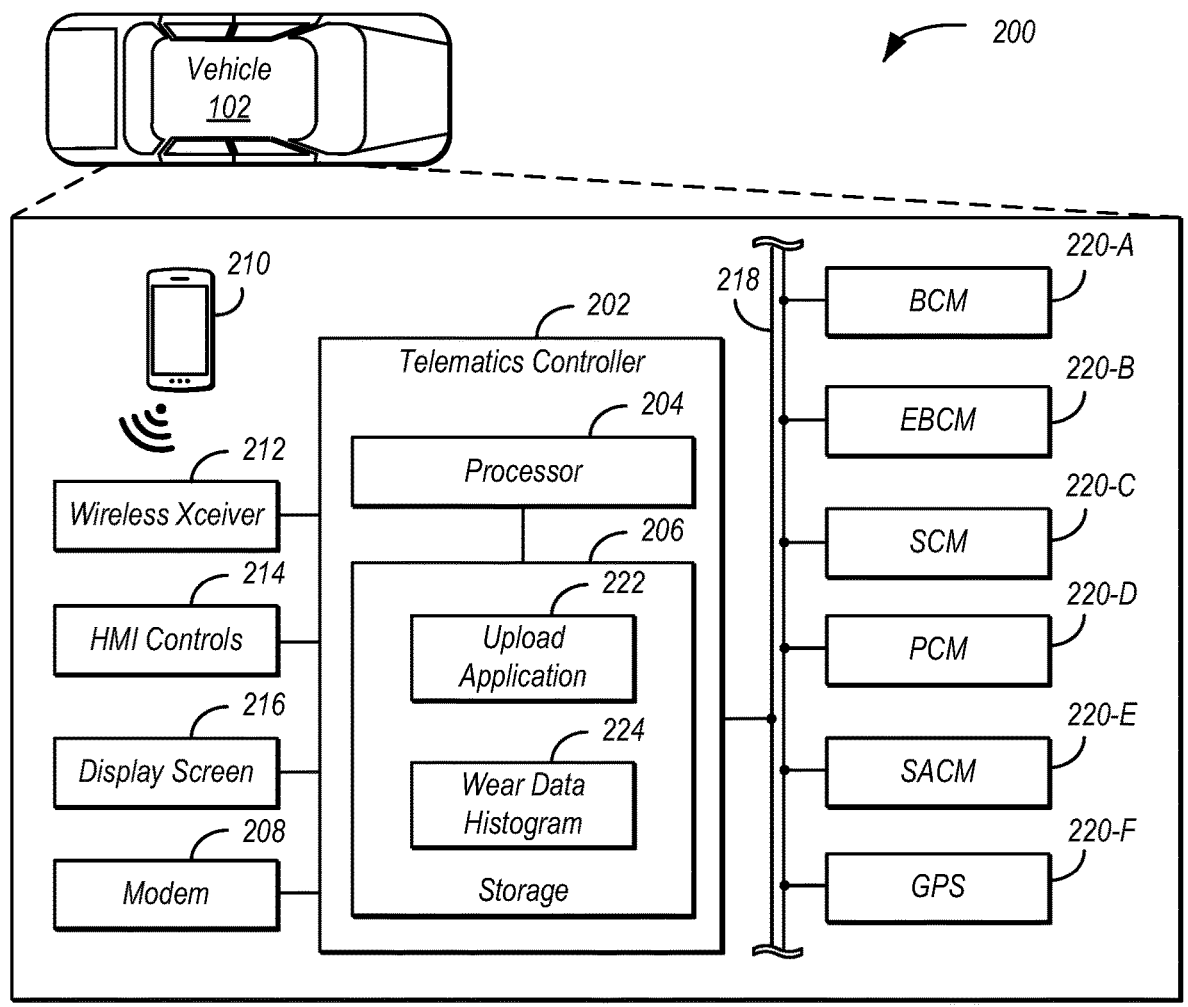
FIG. 2 illustrates an example diagram of the vehicle implementing communications features for use in generating and uploading wear data histograms.

FIG. 2 illustrates an example diagram 200 of the vehicle 102 implementing communications features for use in generating and uploading wear data histograms 224. The vehicle 102 includes a telematics controller 202 configured to communicate over the wide-area network 104. This communication may be performed using a modem 208 of the telematics controller 202. While an example vehicle 102 is shown in FIG. 2, the example components as illustrated are not intended to be limiting. Indeed, the vehicle 102 may have more or fewer components, and additional or alternative components and/or implementations may be used.

The telematics controller 202 may be configured to support voice command and BLUETOOTH interfaces with the driver and driver carry-on devices (e,g, mobile devices 210), receive user input via various buttons or other controls, and provide vehicle status information to a driver or other vehicle 102 occupants. An example telematics controller 202 may be the SYNC system provided by FORD MOTOR COMPANY of Dearborn, Mich.

The telematics controller 202 may further include various types of computing apparatus in support of performance of the functions of the telematics controller 202 described herein. In an example, the telematics controller 202 may include one or more processors 204 configured to execute computer instructions, and a storage 206 medium on which the computer-executable instructions and/or data may be maintained. A computer-readable storage medium (also referred to as a processor-readable medium or storage 206) includes any non-transitory (e,g, tangible) medium that participates in providing data (e,g, instructions) that may be read by a computer (e,g, by the processor(s) 204). In general, a processor 204 receives instructions and/or data, e,g, from the storage 206, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Python, Java Script, Perl, PL/SQL, etc.

The telematics controller 202 may be configured to communicate with mobile devices 210 of the vehicle occupants. The mobile devices 210 may be any of various types of portable computing device, such as cellular phones, tablet computers, smart watches, laptop computers, portable music players, or other devices capable of communication with the telematics controller 202. As with the telematics controller 202, the mobile device 210 may include one or more processors configured to execute computer instructions, and a storage medium on which the computer-executable instructions and/or data may be maintained. In many examples, the telematics controller 202 may include a wireless transceiver 212 (e,g, a BLUETOOTH controller, a ZIGBEE transceiver, a Wi-Fi transceiver, etc.) configured to communicate with a compatible wireless transceiver of the mobile device 210. Additionally, or alternately, the telematics controller 202 may communicate with the mobile device 210 over a wired connection, such as via a USB connection between the mobile device 210 and a USB subsystem of the telematics controller 202.

The telematics controller 202 may also receive input from human-machine interface (HMI) controls 214 configured to provide for occupant interaction with the vehicle 102. For instance, the telematics controller 202 may interface with one or more buttons or other HMI controls 214 configured to invoke functions on the telematics controller 202 (e,g, steering wheel audio buttons, a push-to-talk button, instrument panel controls, etc.). The telematics controller 202 may also drive or otherwise communicate with one or more display screens 216 configured to provide visual output to vehicle occupants, e,g, by way of a video controller. In some cases, the display 216 may be a touch screen further configured to receive user touch input via the video controller, while in other cases the display 216 may be a display only, without touch input capabilities. In an example, the display 216 may be a head unit display included in a center console area of the vehicle 102 cabin. In another example, the display 216 may be a screen of a gauge cluster of the vehicle 102.

The telematics controller 202 may be further configured to communicate with other components of the vehicle 102 via one or more in-vehicle networks 218. The in-vehicle networks 218 may include one or more of a vehicle controller area network (CAN), an Ethernet network, or a media oriented system transfer (MOST), as some examples. The in-vehicle networks 218 may allow the telematics controller 202 to communicate with other vehicle 102 systems, such as a body controller (BCM) 220-A, an electronic brake control system (EBCM) 220-B, a steering control system (SCM) 220-C, a powertrain control system (PCM) 220-D, a safety control system (SACM) 220-E, and a global positioning system (GPS) 220-F. As depicted, the controllers 220 are represented as discrete controllers and systems. However, the controllers 220 may share physical hardware, firmware, and/or software, such that the functionality from multiple controllers 220 may be integrated into a single controller 220, and that the functionality of various such controllers 220 may be distributed across a plurality of controllers 220.

The BCM 220-A may be configured to support various functions of the vehicle 102 related to control of current loads feeding off the vehicle 102 battery. Examples of such current loads include, but are not limited to, exterior lighting, interior lighting, heated seats, heated windshield, heated backlight, and heated mirrors. Additionally, the BCM 220-A may be configured to manage vehicle 102 access functions, such as keyless entry, remote start, and point of access status verification (e,g, closure status of the hood, doors and/or trunk of the vehicle 102).

The EBCM 220-B may be configured to control braking functions of the vehicle 102. In some examples, the EBCM 220-B may be configured to receive signal information from vehicle wheel sensors and/or drivetrain differentials, and manage anti-lock and anti-skid brake functions through control of brake line valves that adjust brake pressure from the master cylinder.

The SCM 220-C may be configured to aid in vehicle steering by augmenting or counter-acting steering effort provided to the vehicle 102 wheels. In some cases, the augmented steering effort may be provided by a hydraulic steering assist configured to provide controlled energy to the steering mechanism, while in other cases the augmented steering effort may be provided by an electric actuator system.

The PCM 220-D may be configured to perform engine control and transmission control functions for the vehicle 102. With respect to engine control, the PCM 220-D may be configured to receive throttle input and control actuators of the vehicle engine to set air/fuel mixture, ignition timing, idle speed, valve timing, and other engine parameters to ensure optimal engine performance and power generation. With respect to transmission control, the PCM 220-D may be configured to receive inputs from vehicle sensors such as wheel speed sensors, vehicle speed sensors, throttle position, transmission fluid temperature, and determine how and when to change gears in the vehicle 102 to ensure adequate performance, fuel economy, and shift quality. The PCM 220-D may further provide information over the in-vehicle networks 218, such as vehicle speed and engine RPM.

The SACM 220-E may be configured to provide various functions to improve the stability and control of the vehicle 102. As some examples, the SACM 220-E may be configured to monitor vehicle sensors (e,g, steering wheel angle sensors, yaw rate sensors, lateral acceleration sensors, wheel speed sensors, etc.), and control the BCM 220-A, SCM 220-C, and/or PCM 220-D. As some possibilities, the SACM 220-E may be configured to provide throttle input adjustments, steering angle adjustments, brake modulation, and all-wheel-drive power split decision-making over the in-vehicle network 218 to improve vehicle stability and controllability. It should be noted that in some cases, the commands provided by the SACM 220-E may override other command input. The GPS 220-F is configured to provide vehicle 102 current location and heading information for use in vehicle 102 services.

An upload application 222 may be an application installed to the memory of the telematics controller 202. When executed by the processor 204, the upload application 222 may cause the telematics controller 202 to generate a wear data histogram 224, and send the wear data histogram 224 to the analysis server 108 for processing.

A histogram is a representation of a distribution of numerical data according to one or more variables. The wear data histogram 224 includes a distribution of information indicative of the wear to the tires of the vehicle 102 according to one or more variables. These variables may include various variables that affect the wear properties of the tires, such as temperature, velocity, and/or steering wheel angle. The wear data histogram 224 may be represented in the storage 206 as an array. The wear data histogram 224 may be updated by the upload application 222 by monitoring the in-vehicle network 218 for data indicative of the tire wear. Further aspects of the generation of the wear data histogram 224 are discussed below with respect to FIGS. 5-8.

Figure 3:
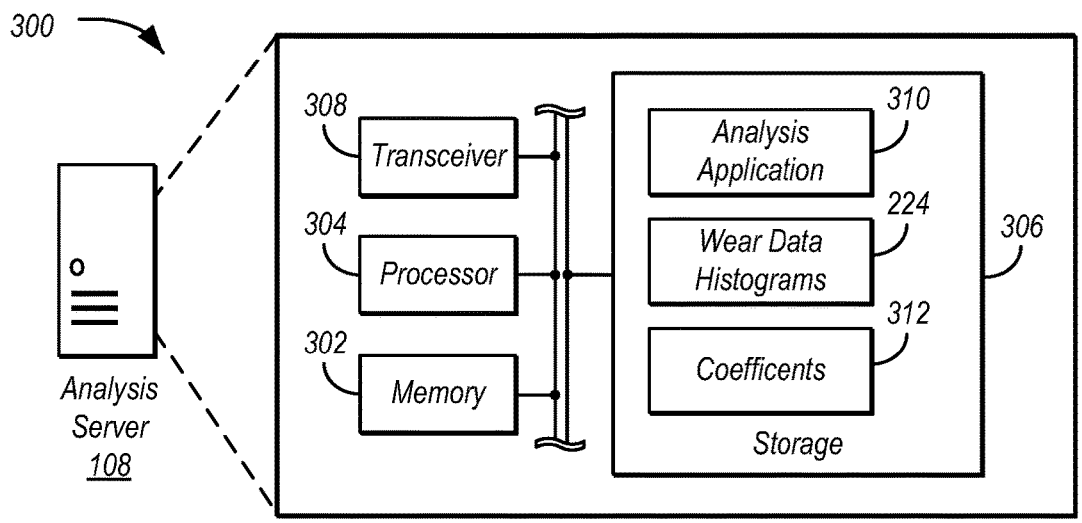
FIG. 3 illustrates an example diagram of the analysis server implementing machine learning facilities for use in analyzing wear data histograms.

FIG. 3 illustrates an example diagram 300 of the analysis server 108 implementing machine learning facilities for use in analyzing wear data histograms 224. The analysis server 108 may include and/or communicate with various types of computing apparatus to facilitate the performance of the analysis server 108 functions. As shown, the analysis server 108 includes one or more memories 302 and processors 304 configured to execute computer instructions, and a storage medium 306 on which the computer-executable instructions and/or data may be maintained.

The analysis server 108 also includes a transceiver 308 to allow the analysis server 108 to communicate over the wide-area network 104 with other devices. The transceiver 308 may include, for example, a modem device. For instance, the transceiver 308 may facilitate communication with the modem 208 of the vehicle 102 and/or with the mobile devices 210.

The analysis application 310 may be an application installed to the storage 306 of the analysis server 108. When executed by the processor 304, the analysis application 310 may cause the analysis server 108 to receive wear data histograms 224 from vehicles 102, maintain coefficients 312 mapping histogram 224 data to actual tire wear, and estimate actual tire wear using the wear data histograms 224 and coefficients 312.

Figure 4:
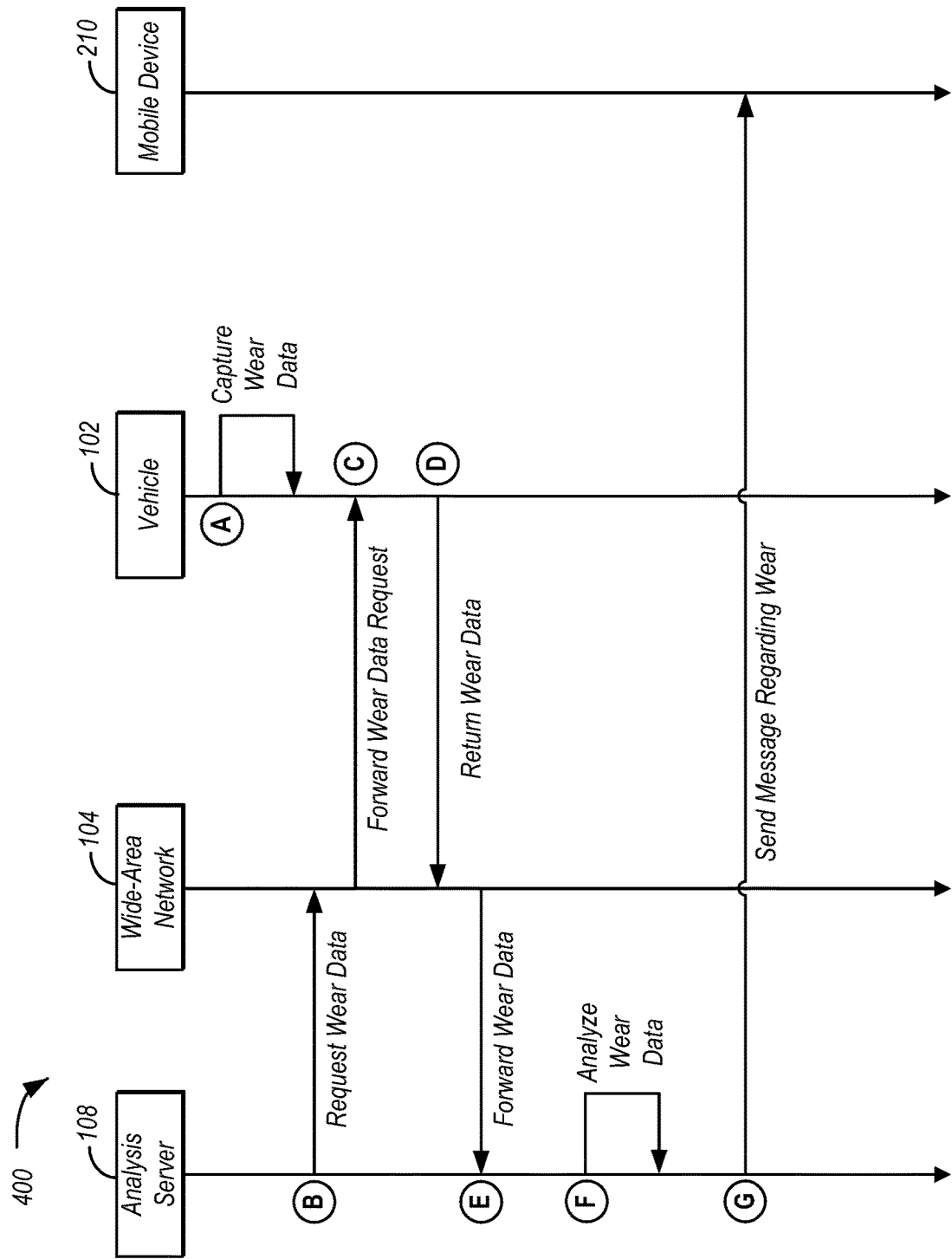
FIG. 4 illustrates an example data flow diagram of the operation of the elements of the system for analyzing wear data from a vehicle to perform tire wear prognostics.

FIG. 4 illustrates an example data flow diagram 400 of the operation of the elements of the system 100 for analyzing wear data from a vehicle 102 to perform tire wear prognostics. At time index (A), the vehicle 102 captures wear data. For instance, the upload application 222 may direct the telematics controller 202 to monitor the in-vehicle network 218 for data indicative of tire wear, and may update the wear data histogram 224 based on the received data. The data indicative of tire wear may include velocity of the vehicle 102, ambient temperature, and steering angle of the vehicle 102, as some examples. While the processing at time index (A) is illustrated at one portion of time, it should be noted that the processing at time index (A) may be performed periodically or continuously, as described in detail below with respect to FIGS. 5-8.

At time index (B), the analysis server 108 sends a request for the wear data histogram 224. This request may be sent over the wide-area network 104 and be addressed to the vehicle 102. The wide-area network 104 may, accordingly, forward the request for the wear data histogram 224 to the vehicle at time index (C). At time index (D), the vehicle 102 sends a response including the wear data histogram 224 responsive to the request. This request may also be sent over the wide-area network 104 but may be addressed to the analysis server 108 (or the sender of the request). The wide-area network 104 may, accordingly, forward the response including the wear data histogram 224 to the analysis server 108 at time index (E). It should be noted that in other examples, the vehicle 102 may provide the wear data histogram 224 to the analysis server 108 based on criteria other than the receipt of a request from the analysis server 108. For instance, the vehicle 102 may send the wear data histogram 224 to the analysis server 108 responsive to the passage of a predefined period of time (e,g, a week, a month), driving of a predefined number of miles (e,g, 100 miles, 1000 miles, etc.), and/or responsive to manual selection (e,g, via the HMI 214 of the vehicle 102, or by service personnel servicing the vehicle 102).

At time index (F), the analysis server 108 analyzes the wear data histogram 224. In an example, for each element of the wear data histogram 224, the analysis server 108 may multiply or otherwise adjust that data element using a coefficient 312 corresponding to that element of the wear data histogram 224. The coefficients 312 may be the result of machine learning trained based on experiments that correlate histogram 224 data to measured tire wear. By using the machine learning process, the analysis server 108 identifies coefficients 312 that translate the histogram 224 data into a measure of the physical wear on the tire. The analysis server 108 may sum these translated values to compute an overall estimate of actual tire wear for the vehicle 102.

At time index (G), the analysis server 108 sends a message regarding the estimated tire wear. In the illustrated example, the analysis server 108 sends a message to the mobile device 210 of the user indicating the estimated tire wear. This message may specify the estimated wear on the tires, or may indicate to the user that the tires should be checked for wear, as some examples.

Figure 5:
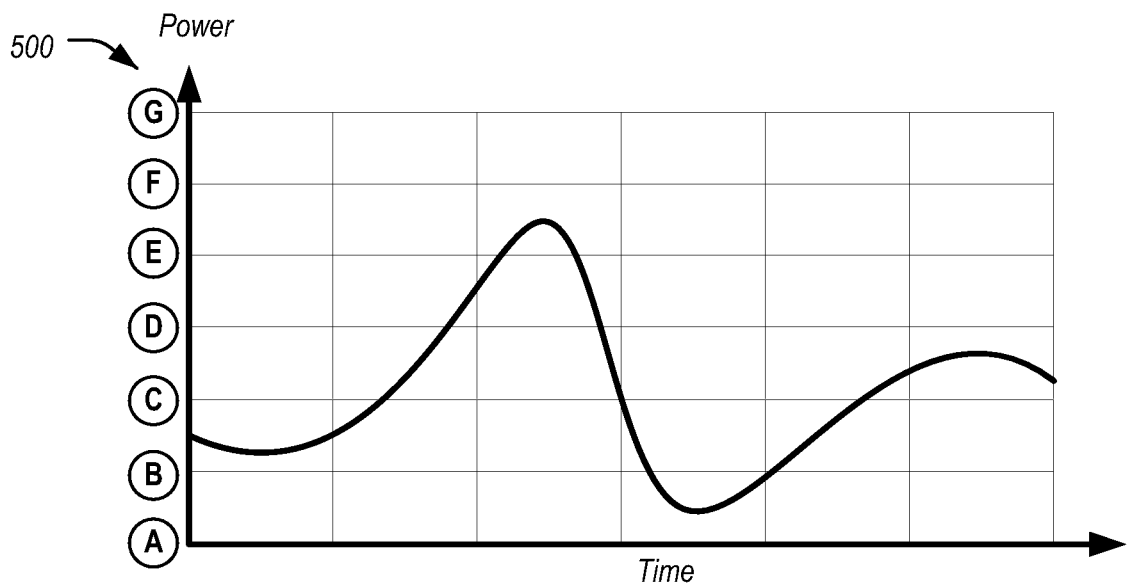
FIG. 5 illustrates an example graph of vehicle power output over time.

FIG. 5 illustrates an example graph 500 of vehicle 102 power output over time. As shown, the X-axis represents time, while the Y-axis represents engine power output of the vehicle 102 over time. Notably, the Y-axis is divided into an arbitrary set of ranges, such that there are ranges of power output of A-B, B-C, C-D, D-E, E-F, and F-G. Additionally, the X-axis is divided into arbitrary units of time.

Figure 6:
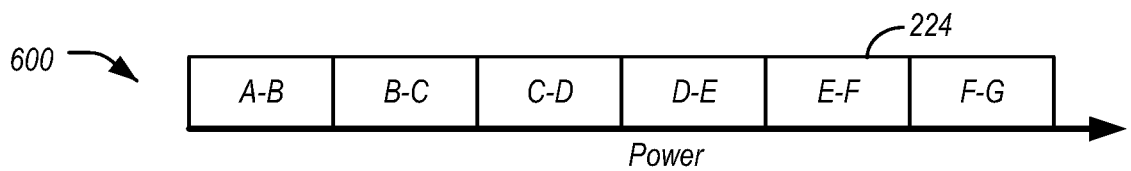
FIG. 6 illustrates an example one-dimensional wear data histogram.

FIG. 6 illustrates an example 600 of a one-dimensional wear data histogram 224. As shown, the wear data histogram 224 includes a plurality of bins, each bin representing an interval of the distribution of vehicle 102 power output data. In general, the bins may be consecutive, non-overlapping adjacent intervals of the power output. In the illustrated example, the bins are of equal size, although in other examples, it is possible for the bins to vary in size. Each bin may store a data value indicative of an amount of time that the power output data is within the interval of the corresponding bin. For instance, the A-B bin stores a value indicating the amount of time that the power output data is within the interval A-B, while the B-C bin stores a value indicating the amount of time that the power output data is within the interval B-C (e,g, referring to the example graph 500 for an example definition of A, B, and C). The wear data histogram 224 may be updated by the upload application 222 by accumulating, into the bins, the amount of time that the power output data of the vehicle 102 is within the respective power output intervals. Power may be a useful variable to separate via histogram, as engine power output is a significant factor in causing tire wear.

Figure 7:
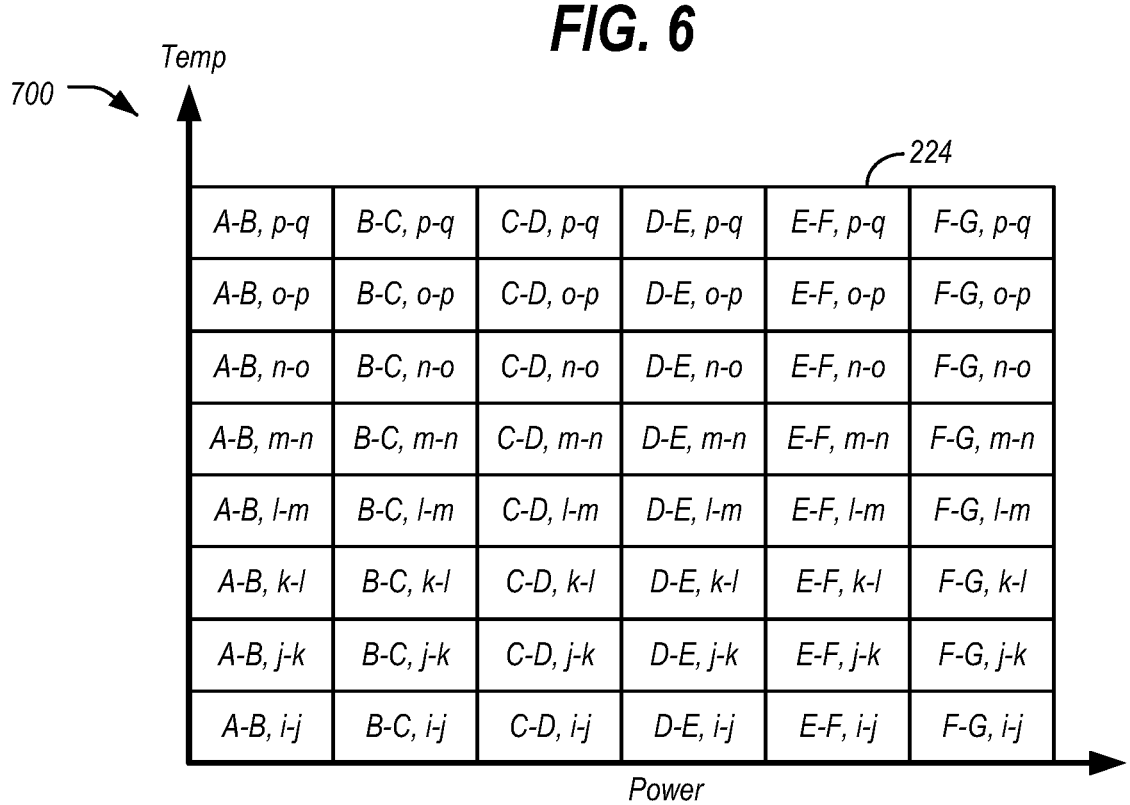
FIG. 7 illustrates an example two-dimensional wear data histogram.

FIG. 7 illustrates an example 700 of a two-dimensional wear data histogram 224. As shown, the wear data histogram 224 includes a plurality of bins, each bin representing an interval of the distribution of vehicle 102 power output data for an interval of ambient temperature. For instance, each bin of the two-dimensional wear data histogram 224 represents an interval of power output data and an independent interval of ambient temperature, such that bin stores a data value indicative of an amount of time that the power output data and temperature are at the same time within the intervals of the corresponding bin. For instance, the A-B, i-j bin stores a value indicating the amount of time that the power output data is within the interval A-B while the temperature is within the interval i-j, while the B-C, i-j bin stores a value indicating the amount of time that the power output data is within the interval B-C while the temperature is within the interval i-j. Temperature may be a useful variable to separate via histogram, as temperature is a significant factor in causing tire wear, even separate from the power output provided to the tires. For instance, if a tire experiences 500 Joules at a higher temperature, that power contributes to more wear on the tire than the same power provided at a lower temperature.

Figure 8:
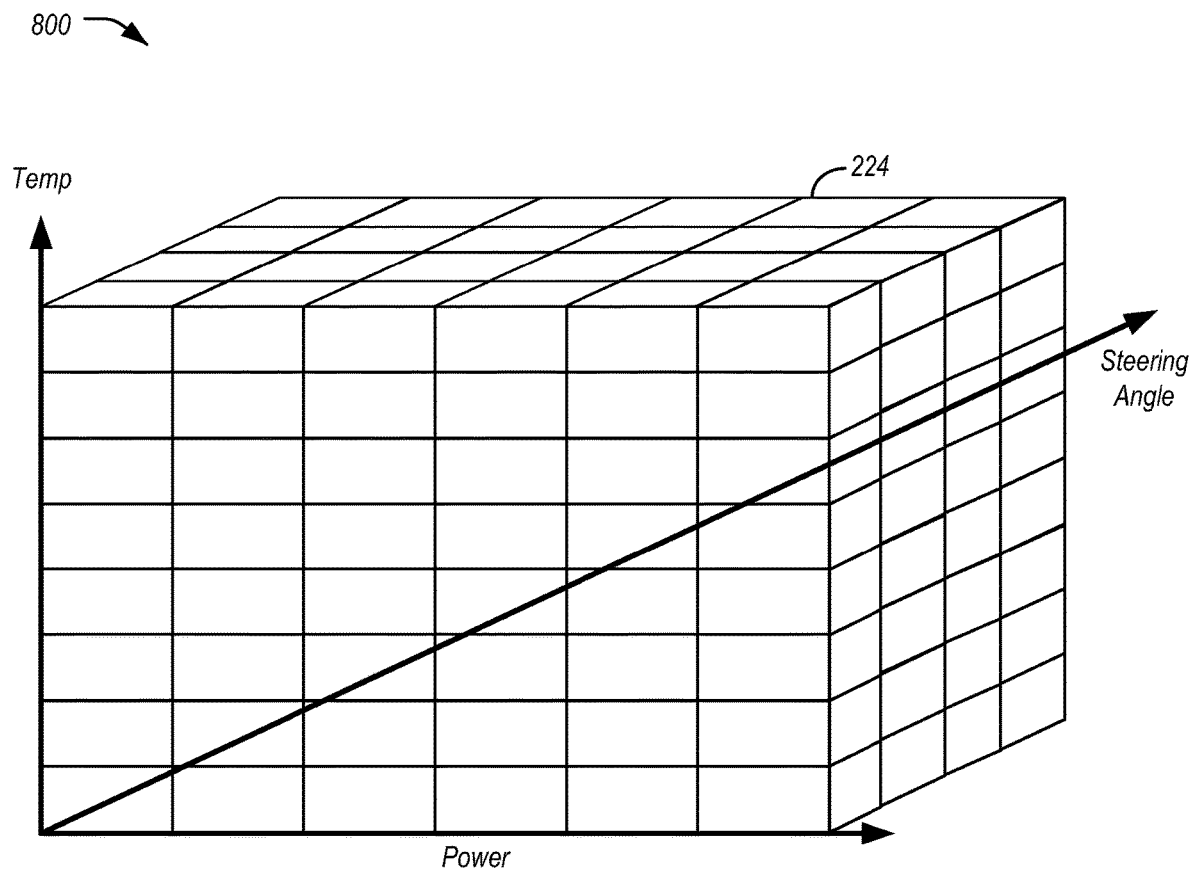
FIG. 8 illustrates an example three-dimensional wear data histogram.

FIG. 8 illustrates an example 800 of a three-dimensional wear data histogram 224. As shown, the wear data histogram 224 includes a plurality of bins, each bin representing an interval of the distribution of vehicle 102 power output data for an interval of ambient temperature for an interval of steering angle of the vehicle 102.

It should be noted that the wear data histograms 224 shown in FIGS. 6-8 are merely examples, and more, fewer, and different variables and intervals may be used in creating the wear data histograms 224 for analysis.

Figure 9:
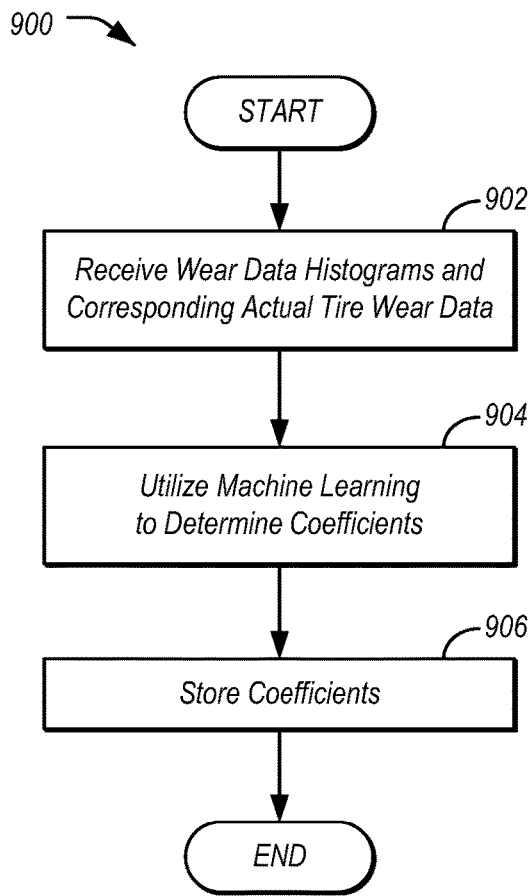
FIG. 9 illustrates an example process for learning coefficients to utilize in providing tire wear prognostics.

FIG. 9 illustrates an example process 900 for learning coefficients 312 to utilize in providing tire wear prognostics. In an example the process 900 may be performed by the analysis server 108 executing the analysis application 310 in the context of the system 100.

At operation 902, the analysis server 108 receives wear data histograms 224 and corresponding actual wear data. In an example, experiments may be performed to capture wear data histograms 224 for vehicles 102, where actual measurements of wear on the tires are also captured. The analysis application 310 of the analysis server 108 may receive these experimental results. In an example, the data may be input to the storage 306 by an operator. In another example, the data may be sent to the analysis server 108 from a mobile device 210 (e,g, over the wide-area network 104).

At 904, the analysis server 108 utilizes machine learning to determine coefficients 312. In an example, the analysis application 310 of the analysis server 108 may be programmed to perform predictive machine learning modeling to minimize an error of a model for making tire wear predictions. For instance, a simple model may assign a coefficient 312 to each bin of the wear data histogram 224, where each coefficient 312 is multiplied by the value of the corresponding bin to convert the bin accumulation of power into an estimate of tire wear. A sum of the products for each of the bins using the coefficients 312 may be used to model the overall tire wear in accordance with the measured tire wear data. Various machine learning techniques may be used by the analysis application 310 to compute the coefficients 312, including, but not limited to, linear regression, least squares, gradient descent, and/or regularization.

The analysis server 108 stores the coefficients 312 at operation 906. The stored coefficients 312 may then be used to predict tire wear based on an arbitrary received wear data histogram 224. After operation 906, the process 900 ends.

Figure 10:
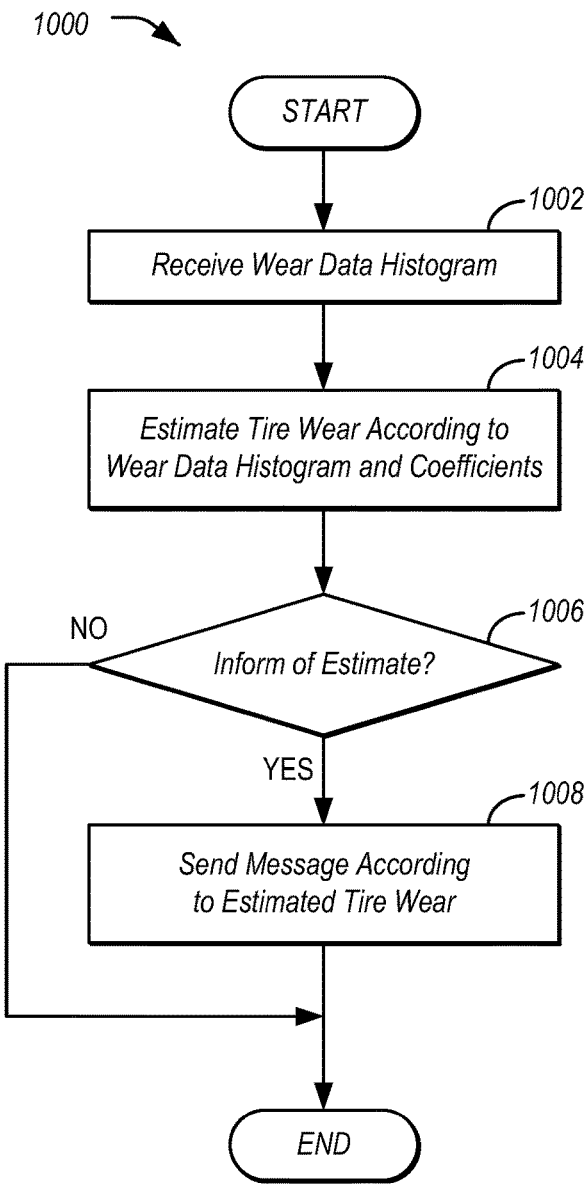
FIG. 10 illustrates an example process providing tire wear prognostics.

FIG. 10 illustrates an example process 1000 providing tire wear prognostics. In an example, and similar to the process 900, the process 1000 may be performed by the analysis server 108 executing the analysis application 310 in the context of the system 100.

At operation 1002, the analysis server 108 receives a wear data histogram 224. In an example, the analysis application 310 of the analysis server 108 may receive the wear data histogram 224 responsive to a request sent by the analysis application 310 to the vehicle 102. In another example, the analysis application 310 may receive the wear data histogram 224 responsive to other criteria, such as by the upload application 222 of the telematics controller 202 identifying the passage of a predefined period of time (e.g., a week, a month), driving a predefined number of miles (e.g., 100 miles, 1000 miles, etc.), and/or responsive to manual selection (e.g., via the HMI 214 of the vehicle 102, by service personnel servicing the vehicle 102, etc.).

At 1004, the analysis server 108 estimates tire wear according to the wear data histogram 224 and the coefficients 312. To determine the amount of wear since the last read, the analysis server 108 may subtract the previously-received wear data histogram 224 values for the vehicle 102 from the values of the newly-received wear data histogram 224. In doing so, the vehicle 102 is not required to reset the wear data histogram 224 data. To estimate the tire wear, in an example, the analysis application 310 of the analysis server 108 may utilize the model trained using the process 900 to estimate tire wear using the received wear data histogram 224. In an example, each coefficient 312 is multiplied by the value of a corresponding bin in the wear data histogram 224 to convert the bin accumulation of power into an estimate of tire wear. A sum of the products for each of the bins using the coefficients 312 may be used to model the overall tire wear represented by the wear data histogram 224.

The analysis server 108 determines whether to inform one or more devices of the estimated tire wear at 1006. In an example, the analysis application 310 of the analysis server 108 may compare the estimated tire wear to a threshold amount of wear, and may determine to send a message if the estimated amount of wear exceeds the threshold amount of wear. For instance, the analysis application 310 of the analysis server 108 may determine to send a message if the wear estimate indicates that the tires have reached ¼, ½, or ¾ of tire life (e.g., indicating that the tires may need rotation, replacement, or inspection). For instance, the analysis application 310 may be programmed to send a first message recommending tire rotation responsive to the measure of physical tire wear exceeding a first wear threshold; and send a second message recommending tire replacement responsive to the measure of physical tire wear exceeding a second wear threshold, the second wear threshold indicating a greater level of wear than the first wear threshold.

In an example, the analysis application 310 of the analysis server 108 may send the message to a network address corresponding to the vehicle 102 having sent the wear data histogram 224. In another example, the analysis application 310 of the analysis server 108 may send the message to a network address corresponding to a mobile device 210 corresponding to the vehicle 102 (e.g., an email address or other address indexed to an identifier of the vehicle 102, such as to the vehicle 102 VIN).

If a message is determined to be sent, control passes to operation 1008 to send the message. After operation 1008, the process 1000 ends. If no message is determined to be sent at operation 1006, the process 1000 also ends.

In general, computing systems and/or devices, such as telematics controller 202, controllers 220, and analysis server 108, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the telematics controller 202, controllers 220, and analysis server 108, generally include computer-executable instructions that may be executable by one or more processors of the computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the telematics controller 202, controllers 220, and analysis server 108 may be such computer program products (e.g., the upload application 222, the analysis application 310). In some examples, these computer program products may be provided as software that when executed by one or more processors provides the operations described herein. Alternatively, the computer program products may be provided as hardware or firmware, or combinations of software, hardware, and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A system comprising:
a storage that maintains coefficients that map histogram data elements to tire wear, the coefficients being trained based on a correlation of histogram data to measured tire wear; and
a processor programmed to
receive a wear data histogram from a vehicle,
utilize the coefficients to translate the wear data histogram into an estimated measure of physical tire wear, and
send an alert message indicating the estimated physical tire wear.

2. The system of claim 1, wherein the wear data histogram includes a distribution of power indicative of wear to tires of the vehicle according to one or more variables.

3. The system of claim 2, wherein the one or more variables include one of engine power output, ambient temperature, or steering angle.

4. The system of claim 2, wherein the one or more variables include two of engine power output, ambient temperature, or steering angle.

5. The system of claim 2, wherein the one or more variables include engine power output, ambient temperature, and steering angle.

6. The system of claim 1, wherein the processor is further programmed to:
request the wear data histogram from the vehicle; and
send the alert message to a mobile device corresponding to the vehicle.

7. The system of claim 1, wherein the processor is further programmed to:
receive actual wear data corresponding to a plurality of experimental wear data histograms; and
determine the coefficients using machine learning trained using the actual wear data and the corresponding plurality of experimental wear data histograms.

8. The system of claim 1, wherein the histogram includes a plurality of bins, and the processor is further programmed to:
multiply a value indicated in each of the plurality of bins by a coefficient corresponding to the respective bin to create a translated product for each bin; and
generate the measure of physical tire wear as a sum of the translated products.

9. A method comprising:
utilizing coefficients that map histogram data elements to tire wear, the coefficients being trained based on a correlation of histogram data to measured tire wear, to translate a wear data histogram, including a distribution of power indicative of wear to tires of a vehicle according to one or more variables, into a measure of physical tire wear.

10. The method of claim 9, further comprising:
sending a first message recommending tire rotation responsive to the measure of physical tire wear exceeding a first wear threshold; and sending a second message recommending tire replacement responsive to the measure of physical tire wear exceeding a second wear threshold, the second wear threshold indicating a greater level of wear than the first wear threshold.

11. The method of claim 9, wherein the one or more variables include one of engine power output, ambient temperature, or steering angle.

12. The method of claim 9, wherein the one or more variables include two of engine power output, ambient temperature, or steering angle.

13. The method of claim 9, wherein the one or more variables include engine power output, ambient temperature, and steering angle.

14. The method of claim 9, further comprising determining the coefficients using machine learning trained using a plurality of experimental wear data histograms and actual wear data corresponding to the plurality of experimental wear data histograms.

15. The method of claim 9, further comprising generating the measure of physical tire wear as a sum of translated products computed by multiplying a value indicated in each of a plurality of bins of the wear data histogram by a coefficient corresponding to the respective bin.

16. A non-transitory computer-readable medium comprising instructions that, when executed by a processor, cause the processor to utilize coefficients that map histogram data elements to tire wear, the coefficients being trained based on a correlation of histogram data to measured tire wear, and to translate a wear data histogram, including a distribution of power indicative of wear to tires of a vehicle according to one or more variables, into a measure of physical tire wear.

17. The medium of claim 16, further comprising instructions that, when executed by the processor, cause the processor to:
send a first message recommending tire rotation responsive to the measure of physical tire wear exceeding a first wear threshold; and
send a second message recommending tire replacement responsive to the measure of physical tire wear exceeding a second wear threshold, the second wear threshold indicating a greater level of wear than the first wear threshold.

18. The medium of claim 16, wherein the one or more variables include one of engine power output, ambient temperature, or steering angle.

19. The medium of claim 16, further comprising instructions that, when executed by the processor, cause the processor to determine the coefficients using machine learning trained using a plurality of experimental wear data histograms and actual wear data corresponding to the plurality of experimental wear data histograms.

20. The medium of claim 16, further comprising instructions that, when executed by the processor, cause the processor to generate the measure of physical tire wear as a sum of translated products computed by multiplying a value indicated in each of a plurality of bins of the wear data histogram by a coefficient corresponding to the respective bin.

* * * * *